P. LORD.
GEARING.
APPLICATION FILED NOV. 11, 1910.

1,007,584.

Patented Oct. 31, 1911.

2 SHEETS—SHEET 1.

Witnesses
H. Davis
P. Shee

Inventor
P. Lord
By E. Ruterstonhaugh
Atty

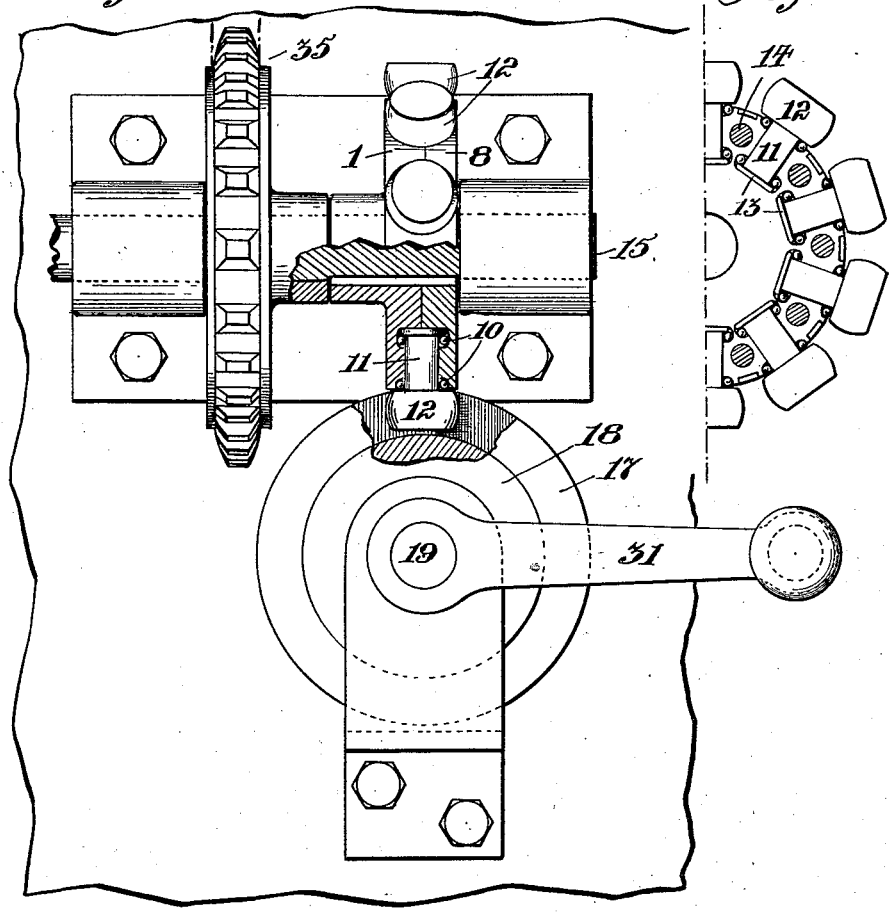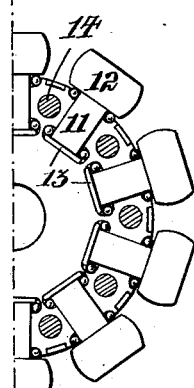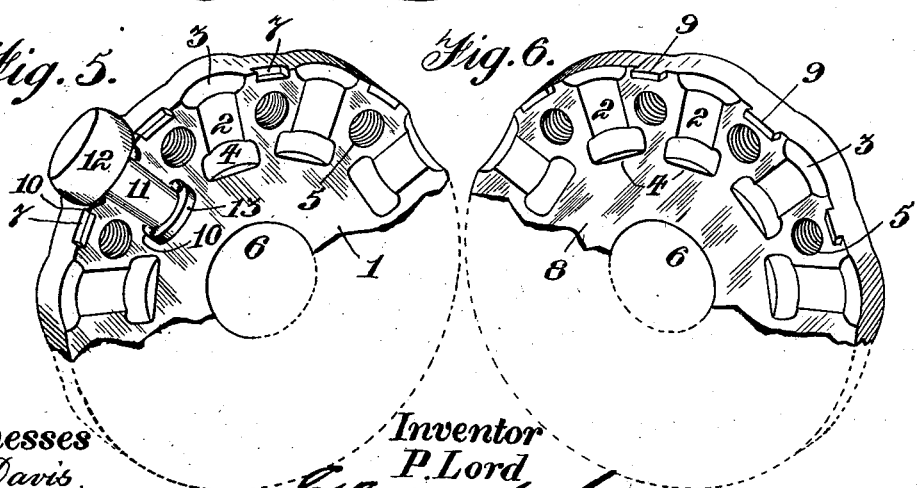

UNITED STATES PATENT OFFICE.

PETER LORD, OF MONTREAL, QUEBEC, CANADA, ASSIGNOR OF ONE-FOURTH TO JOSEPH ANTOINE HEBERT, ONE-FOURTH TO CHARLES LELUAU, ONE-EIGHTH TO LOUIS ADHEMAR DELORME, AND ONE-EIGHTH TO GUSTAVE ITZWERRE, ALL OF MONTREAL, CANADA.

GEARING.

1,007,584.  Specification of Letters Patent.  Patented Oct. 31, 1911.

Application filed November 11, 1910. Serial No. 591,875.

*To all whom it may concern:*

Be it known that I, PETER LORD, a resident of 140 Berri street, in the city and district of Montreal, Province of Quebec, in the Dominion of Canada, mechanical engineer, have invented certain new and useful Improvements in Gearing; and I do hereby declare the following to be a full, clear, and exact description of the same.

The invention relates to improvements in shaft rotors, as described in the present specification and illustrated in the accompanying drawings that form part of the same.

The invention consists essentially in the novel construction and arrangement of parts, whereby a shaft is rotated by the engagement of the worm with rotating tooth members, and whereby certain peculiar structural features are made to conform in the general combination.

The objects of the invention are to devise a means of rotating a rudder-post and other shafts which shall permit of a very nice adjustment in the positions of the shaft, insure an absolute lock to each of such positions and facilitate the steering of boats, and generally to provide a simple, inexpensive and durable device.

Figure 1:
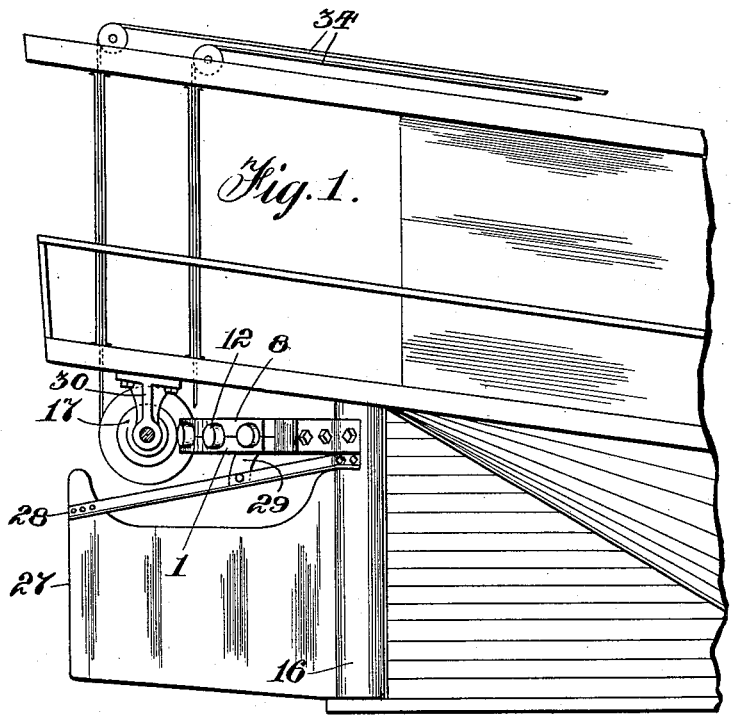
Figure 2:
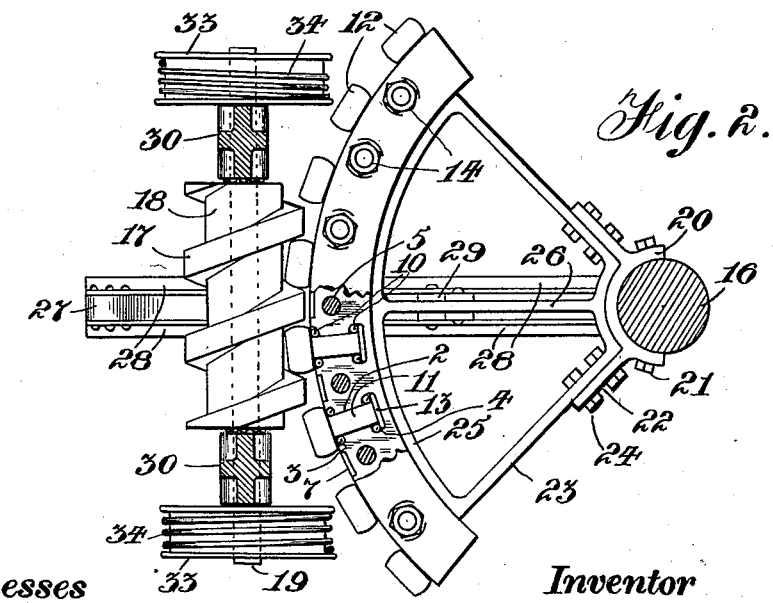

In the drawings, Figure 1 is a side elevation of the stern portion of a boat, showing the invention applied as a rotor for turning the rudder post. Fig. 2 is an enlarged plan view of the worm gearing, partly in section and showing the rudder post in cross section. Fig. 3 is a front elevation of the invention as applied to the rotation of a shaft for various purposes and Fig. 4 is a view showing one half the worm wheel in section. Fig. 5 is an enlarged perspective detail of one-half of the worm wheel, broken away. Fig. 6 is an enlarged perspective detail of the other half of the worm wheel broken away.

Referring to the drawings, 1 is one-half of the worm gear shown in Figs. 1 and 2 as a quadrant and in the other views as a complete wheel and having the spindle recesses 2, the ball races 3 and 4 at each end of said spindle recesses, the bolt holes 5 between said recesses 2, the central shaft orifice 6 and the grooves 7 between the ball races 3. 8 is the other half of the worm gear having recesses, ball races, bolt holes and shaft orifice corresponding to the recesses 2, ball races 3 and 4, bolt holes 5 and the shaft orifice 6 and the tongues 9 fitting into the grooves 7.

10 are balls in the races 3 and 4.

11 are spindles turning in the recesses 2 having at their outer ends the heads 12 forming rollers and projecting beyond the rim of the said gear and on the inner side thereof inclosing the balls in the races 3 and at the inner end the flanges 13 projecting under the balls in the races 4.

14 are bolts rigidly securing the halves 1 and 8 together.

It will be thus seen that the worm wheel or quadrant is complete having the rotating tooth members formed by the roller heads 12 of the spindles 11, said rollers turning very freely as they are journaled in ball bearings and consequently avoid loss of power and provide a nice adjustment by minimizing the friction. 15 is a shaft on which the said worm gear is mounted in the form of a worm wheel. 16 is a rudder post on which the said worm gear is mounted in the form of a worm quadrant. 17 is a worm mounted on or forming part with the hub 18, said hub being operated by the shaft 19, the said worm 17 coacts with the said worm gear wheel or quadrant in rotating the shaft 15 or the rudder post 16, as the case may be.

In the application of this invention as steering gear for a ship or boat of any suitable description, the preferable manner of securing the parts in place is to secure the bracket 20 rigidly to the rudder post, said bracket 20 partially encircles the rudder post 16 and is secured thereto by the bolts 21. The arms 22 project outwardly and are rigidly secured to the open frame 23 by the bolts 24, the said frame has an outer arc-shaped bar 25 from which projects inwardly the center bar 26. The said worm gear in the form of a quadrant is rigidly secured to the arc-shaped bar 25.

The tail 27 of the rudder in many boats will be connected to the rudder post 16 by the tie rods 28 and these tie rods are rigidly connected with the center bar 26 by the brace 29. This is a very effective method of securing the quadrant portion of the worm gearing to the rudder.

The worm shaft 19, where this device is used for the steering gear of a boat, is journaled in the brackets 30, said brackets being shown in the accompanying drawings as secured to the under side of the stern overhang of the boat, though it will, of course, be understood that the bearings for the worm shaft may be secured in any suitable place, similarly a quadrant may be secured at any suitable place on the rudder post, either below or above the deck.

31 is a crank handle used in operating the shaft 19 in the application of the invention as illustrated in Fig. 4.

33 are spools fixedly mounted on the shaft 19 at each end thereof in the application of the invention as illustrated in Figs. 1 and 2.

34 are cables wound on the spools 33 and connected with suitable operating means usually at the bow portion of the boat.

In the operation of this invention, and particularly referring to Figs. 1 and 2, the tightening up and drawing on one of the cables 34 rotates the spool on which said cable is wound, this has the effect of rotating the shaft 19 and consequently the worm 17 and as this worm coacts with the worm quadrant, said quadrant is rotated a part of a revolution and this has the effect of rotating the rudder post and swinging the rudder to one side or the other as the case may be. The worm in engagement with the quadrant contacts with the edge faces of the roller heads 12 so that said roller heads turn freely coincidently with the rotation of the quadrant, thereby reducing the friction to a minimum.

The operation of the invention in the worm wheel type is precisely similar with the one exception that the shaft is turned direct by a crank or hand wheel and whether this is on a motor car or for turning a shaft for other purposes, it is precisely the same operation, for the worm wheel shaft is rotated and if this shaft is connected with the steering apparatus of a motor car, the wheels are moved in the direction required. The invention, however, is useful for many purposes and one of these may be mentioned, that is, where it is operated for indicating signs, as for instance in railway cars, to denote stations or streets, and in such cases, the most convenient way of operating is by a crank handle, when the said crank handle will be given a quarter or a half turn and thereby rotate the shaft carrying the roll on which the names of the streets are printed. The connection to such a shaft may be made in any suitable way, though to more clearly demonstrate this use, a sprocket wheel and chain 35 are shown in Fig. 3.

It will be thus seen that in every use, the nice adjustment and the locking feature are prominent and these two features make the invention of inestimable service in steering a boat, a motor car and other vehicles, and in operating shafts for advertising, indicating and various devices.

What I claim as my invention is:

1. In a gearing, a worm gear member comprising two halves placed face to face, each half having journal recesses therein extending a short distance inward from the outer edge, tooth members rotatable in said journal recesses and each having a larger diameter head at the outer end thereof integral therewith, means hidden and protected between said halves for retaining said tooth members in said recesses, means securing said halves together and a worm engaging said tooth members.

2. In gearing, a worm gear member comprising two halves placed face to face each half having a plurality of journal recesses and a deeper recess at the inner end of said journal recesses, a plurality of tooth members journaled in said recesses each having an integral head at the outer end and a retaining flange at the inner end, said retaining flanges fitting loosely in said deeper recesses and being rotatable and entirely hidden therein, suitable means for holding said halves together with the tooth members rotatable therebetween and a worm gear engaging said tooth members.

3. In gearing, a worm gear member split through its edge face forming two halves adapted to be placed face to face each half having radially arranged semi-circular journal recesses and deeper semi-circular recesses at the inner end of said journal recesses and half ball races at the outer and inner ends of said journal recesses respectively, tooth members journaled in said recesses each comprising a spindle adapted to fit said journal recesses, a larger diameter head at the outer end integral therewith, said head being arc shaped across its periphery and a lateral annular retaining flange integral with said spindle at the inner end and disposed rotatably in said deeper recesses, balls beneath said spindle heads in said outer ball races and balls in said inner ball races contacting said retaining flange, means securing said two halves together with the spindles, retaining flanges and balls hidden and protected therebetween and a worm engaging said tooth members.

Signed at the city of Montreal, Quebec, Canada, this second day of November, 1910.

PETER LORD.

Witnesses:
P. SHEE,
G. H. TRESIDDER.

---

Copies of this patent may be obtained for five cents each, by addressing the "Commissioner of Patents, Washington, D. C."